J. J. BERRIGAN.
PROCESS OF SEPARATING LIQUIDS AND SOLIDS AND WASHING OR OTHERWISE TREATING THE SEPARATED SOLIDS.
APPLICATION FILED MAR. 6, 1908.
1,087,094.
Patented Feb. 10, 1914.
2 SHEETS—SHEET 1.
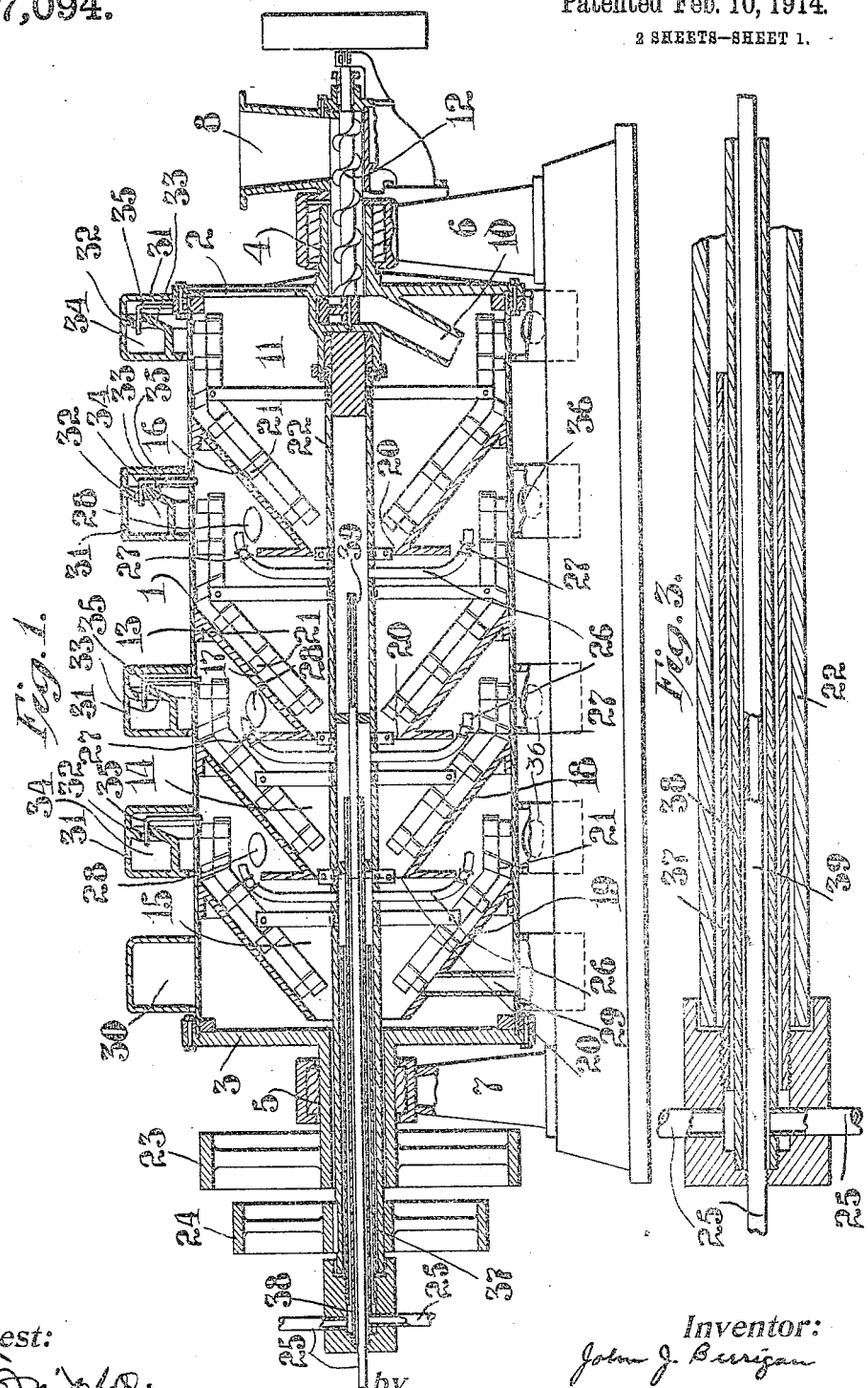
Attest:
Inventor:
John J. Berrigan

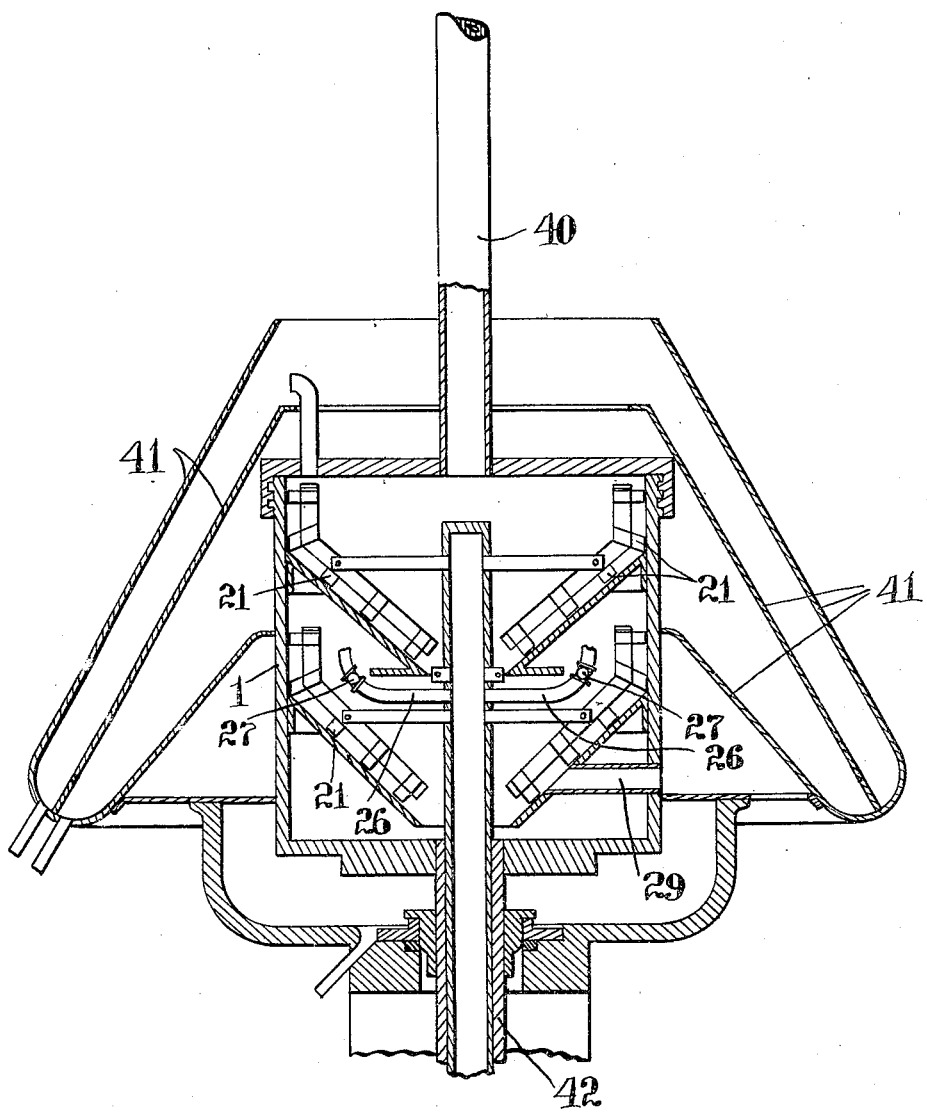

UNITED STATES PATENT OFFICE.

JOHN J. BERRIGAN, OF ORANGE, NEW JERSEY, ASSIGNOR TO FRANCIS J. AREND, OF NEW YORK, N. Y., AND JOHN BERNSTROM, OF STOCKHOLM, SWEDEN.

PROCESS OF SEPARATING LIQUIDS AND SOLIDS AND WASHING OR OTHERWISE TREATING THE SEPARATED SOLIDS.

1,087,094.      Specification of Letters Patent.      Patented Feb. 10, 1914.

Application filed March 6, 1908. Serial No. 419,487.

*To all whom it may concern:*

Be it known that I, JOHN JOSEPH BERRIGAN, a citizen of the United States, and a resident of Orange, in the county of Essex and State of New Jersey, have invented a certain new and useful Process of Separating Liquids and Solids and Washing or Otherwise Treating the Separated Solids, of which the following is a specification.

My invention relates to a process of separating liquids and solids and washing or otherwise treating the separated solids, through the agency of "centrifugal force."

My said process comprises separating, by centrifugal action, the greater part of the liquids from the solids, and then passing the resulting solids, centrifugally, through a wall or walls of liquid suitable for washing or otherwise treating the said solids, and finally separating the solids from such washing or treating liquid.

The objects of my invention are to separate solids from liquids efficiently and to wash or otherwise treat the separated solids, finally delivering the solids in such stage of dryness as is desired.

The accompanying drawings illustrate apparatus adapted for carrying out the process of my invention.

In said drawings, Figure 1 shows a vertical axial section of a horizontal type of machine adapted for carrying out my invention, and Fig. 2 shows a similar section of a vertical type of machine for the same purpose. Fig. 3 shows a detail axial section, on a larger scale, of the concentric passages of the apparatus of Fig. 1.

The said machines are of the type illustrated in my Patent No. 965,558, dated July 26, 1910.

Referring first to Fig. 1, illustrating the horizontal type of machine (which is, in general, the type of machine preferably employed when there are to be a number of separations or washings or dryings, or where high capacity is desired), 1 designates a separating cylinder or drum having heads 2 and 3 and journals 4 and 5 mounted in bearings in standards 6 and 7 whereby the drum is mounted for rotation. Both of journals 4 and 5 are hollow, journal 4 having within it a supply-passage leading from a hopper 8 to a delivery-chute 10 within the first chamber 11 of drum 1. A suitable conveyer 12 serves to convey the mixed solids and liquids from the hopper to this delivery chute and so to deliver the mixture to be separated into the first chamber of the apparatus. The interior of drum or chamber 1 is divided into a plurality of chambers, (11, 13, 14, and 15, in the construction shown) by means of partitions (16, 17, 18 and 19, in the construction shown), said partitions having in them central openings 20 through which the solid material may be passed from one chamber to another. There may be as many of these partitions, and chambers in the drum, as the treatment of any particular material may require or make seem desirable. In the construction shown, the partitions are conical; that is to say, their surfaces are inclined toward the axis of rotation; and to move the solid material toward and up these inclined surfaces I provide conveyers 21, one for each such chamber, mounted on a conveyer shaft 22 passing through the hollow journal 5 of the drum, and arranged to be rotated at a speed different from (and usually less than) the speed of the drum. I have shown belt wheels 23 and 24 for rotating the drum 1 and the conveyer shaft 22 respectively; but any suitable means for rotating said drum and shaft may be employed. The shaft 22 is hollow, and serves as means for supplying to one or more of the chambers 13, 14, and 15, as desired, liquid for washing or otherwise treating the solid material. Such liquid is supplied to the shaft by means of pipes 25; and the shaft is provided, within the several chambers 13, 14 and 15, or such of said chambers as it may be desired to introduce liquid into, with branch pipes 26, provided with regulating valves 27. Suitable hand-holes 28 are provided, through which access may be had to said valves to open or close or regulate them. The final chamber, 15, is provided with a radial discharge passage 29 for the solid material; and surrounding the drum is an annular trough 30 for receiving the solid material discharged from this passage 29. For receiving and collecting the liquid discharged from the various chambers 11, 13, 14 and 15, I provide other annular troughs or chambers, 31, each about opposite one of the said chambers. These liquid-collecting chambers are of different construction from the chambers for the same purpose shown in my above entitled patent, in that they are provided with internal flanges, 32 and 33, forming an inner annular channel 34, to which the only entrance is the narrow space between the flanges 32 and 33; and liquid discharge pipes, 35, project from the several chambers 11, 13, 14 and 15 through such space between the flanges 32 and 33 of the corresponding chamber 31, so as to discharge liquid into the inner channel 34 of that chamber. This construction effectively precludes escape of the liquid from these chambers 31 except into the usual discharge pipes 36 with which these chambers 31 are provided. The pipes 35 project within the drum to points beyond the normal levels of the annuli of solid material in the drum, but not beyond the normal liquid levels of said annuli; so that practically only liquid escapes into the chambers 31.

The method of operation of this apparatus, and the method of carrying out my said process, are as follows: The mixture containing the solid material to be treated is fed from the hopper into the first chamber 11, of the drum, and forms therein an annulus, of which the solid material (supposing, as is usually the case, that the solid material is the heavier) forms an outer layer and the liquid an inner layer. The liquid from this annulus continually escapes through pipe 35 into the first chamber 31. The solid material in the annulus is continually moved forward by the conveyer, toward and up the first conical partition, 16, much, if not practically all, of the liquid separating from the solid material during the passage of the latter up this partition 16, and flowing back into the annulus in chamber 11. The solid material is forced by the conveyer through the central orifice in partition 16, and is at once thrown centrifugally to the outside of chamber 13, passing through the annulus of liquid in said chamber, if there be any there, and then being carried up the second partition, 17, in like manner, and so on, until finally the solid material is discharged into annular chamber 30. Since each pipe 26 is provided with a valve, by which the flow of liquid into the corresponding chamber of the drum may be regulated as desired, or prevented altogether, a wide variation of operations is possible with the same apparatus. For example, if liquid be admitted from shaft 22 into each of chambers 13, 14 and 15, the solid material will be subjected to three successive washings or other treatment by such liquid in the said chambers, with more or less complete drying between the several treatments and with a final drying during its passage up the last partition, 19, toward the discharge 29. If liquid is admitted from the hollow shaft to only chambers 13 and 14, the material will be subjected to two successive dryings; and if liquid is admitted from said shaft only to chamber 13, the material will be subjected to three successive dryings; which will, in most cases, result in the thorough drying of even most difficult materials. If liquid is admitted from shaft 22 into chambers 14 and 15 only, the solid material is subjected, in chambers 11 and 13, to two successive separations from the liquid with which it was mixed initially, followed by treatment as above described in chambers 14 and 15; and if liquid is admitted from shaft 22 into chamber 14 only, the solid material is subjected to successive separations in chambers 11 and 13, followed by treatment in chamber 14, and by successive dryings in chambers 14 and 15. Since, as above stated, the number of these chambers may be increased or decreased as desired, it is obviously possible to subject the solid material to any desired number of separations from the liquid with which it is mixed initially, followed by any desired number of washings or other treatment with liquid, and followed again by any desired number of successive dryings. It is obviously possible to supply different liquids to the various chambers 13, 14 and 15; and this I have illustrated in Fig. 1, in which I show the shaft 22 as provided with concentric passages 37, 38, and 39, communicating through pipes 26 each with a particular chamber of the drum 1.

The vertical form of machine shown in Fig. 2 is in principle the same as that shown in Fig. 1; and in general, in machines of this class it is a matter of indifference, theoretically, whether the machine be set to revolve on a horizontal, inclined, or vertical axis; gravity having little or no perceptible influence on the rapidly rotating material. Mechanical considerations usually render the horizontal type of machine preferable, however, particularly when the drum is to be of large size or considerable length or is to provide for a number of successive operations. In the vertical form of machine shown, I have shown the material to be treated admitted at the top through pipe 40 and the solid material discharged at the bottom; the liquid being discharged into concentric pans 41. The drum is here rotated by a vertical shaft 42, through which the washing liquid or other liquid is supplied, as in the horizontal form of machine. The washing or other action of liquid on solid material obtained by throwing the solid material centrifugally through a wall of liquid, as in this machine, is a particularly effective action, so far as action on the surfaces of the particles of the solid material is concerned, and has the advantage, for many processes, that contact of the liquid with the solid material is brief at the most. For example, in purifying sugar, the passage of the sugar crystals through the wall of washing liquor suffices to cleanse the crystals instantly of molasses or other impurities carried by them, while the crystals are in contact with the washing liquor for too brief a time to permit any material solution thereof. As usual in sugar purification, the liquid supplied to the different chambers, 13, 14 and 15, may be sugar solutions of different degrees of strength and purity. The treatment may be carried on in such manner that while the crystals are thoroughly cleansed, there is practically no breaking of the crystals themselves. The same considerations which make my said process particularly applicable to sugar purification, also make it particularly applicable to the purification of salt and like substances.

It is obvious that I may so construct the separator as to combine the features of construction and operation above described with those of an eccentric separator such as shown, for example, in my Patent No. 827,903, dated Aug. 7, 1906. The method of and means for doing so are obvious, and hence I will not particularly describe and illustrate them herein. If desired, the liquid supplied to chambers 13, 14 and 15, or either of them, may be acid, alkali, cyanid solution such as used in the extraction of precious metals from their ores, and various other chemically active liquids. And in like manner a great variety of solid materials may be treated by the above process and in the above apparatus.

What I claim is:—

1. In the separation of liquids and solids, the process which comprises effecting more or less complete separation of the solid from the liquid by centrifugal action, and then passing the so-separated solid material centrifugally through a layer of another liquid, and thereby washing such solid material.

2. In the separation of liquids and solids, the process which comprises effecting more or less complete separation of the solid from the liquid by centrifugal action, passing the so-separated solid material centrifugally through a layer of another liquid and thereby washing such solid material, and then separating such solid from such other liquid by centrifugal action.

3. In the separation of liquids and solids, the process which comprises effecting more or less complete separation of the solid from the liquid by centrifugal action, and passing the so-separated solid material centrifugally through a plurality of liquid layers with intermediate separation of the solid and liquid, and thereby washing such solid material.

In testimony whereof I affix my signature, in the presence of two witnesses.

JOHN J. BERRIGAN.

Witnesses:
H. M. MARBLE,
FRANK E. RAFFMAN.